US009348556B2

(12) United States Patent
Vierthaler et al.

(10) Patent No.: US 9,348,556 B2
(45) Date of Patent: May 24, 2016

(54) METHOD AND DEVICE FOR NOISE SUPPRESSION IN A DATA PROCESSING ARRANGEMENT

(75) Inventors: Matthias Vierthaler, Denzlingen (DE); Florian Pfister, Endingen (DE); Dieter Luecking, Freiburg (DE)

(73) Assignee: ENTROPIC COMMUNICATIONS, LLC, Carlsbad, CA (US)

( * ) Notice: Subject to any disclaimer, the term of this patent is extended or adjusted under 35 U.S.C. 154(b) by 1595 days.

(21) Appl. No.: 11/189,009

(22) Filed: Jul. 25, 2005

(65) Prior Publication Data

US 2006/0034468 A1 Feb. 16, 2006

(30) Foreign Application Priority Data

Aug. 12, 2004 (DE) .......................... 10 2004 039 345

(51) Int. Cl.
*H04B 15/00* (2006.01)
*G06F 7/48* (2006.01)

(52) U.S. Cl.
CPC ........................................ *G06F 7/48* (2013.01)

(58) Field of Classification Search
CPC .............. G10L 19/008; G10L 19/0212; G10L 19/0204; G10L 19/035; G10L 19/018; G10L 19/02; G10L 19/032; G10L 19/002; G10L 19/025; G10L 25/27; H04B 1/667; H04B 1/707; G11B 20/10527; G11B 20/00; G11B 2020/10546; H04S 3/008; H04S 7/00; H04H 20/91
USPC .............. 704/200.1, 201, 226–228, 230, 229, 704/222, 256.8, E15.035, E19.015, 704/E19.016, E19.017; 381/316, 320, 98, 381/71.14, 402, 55, 56, 57, 317, 318, 319, 381/321, 71.1–71.12, 71.13, 72, 73.1, 77, 381/82, 83, 84, 92, 93, 94.1, 94.2–94.9, 95, 381/97, 99, 100, 101, 102, 103, 104, 106, 381/107, 108, 110, 111, 112, 113, 114, 115, 381/118, 119, 120, 121, 122; 379/392.01; 700/94
See application file for complete search history.

(56) References Cited

U.S. PATENT DOCUMENTS 3,562,504 A * 2/1971 Harris ............................. 341/75
4,872,132 A * 10/1989 Retter ........................... 708/505

(Continued)

FOREIGN PATENT DOCUMENTS

WO WO 00/73872 12/2000

OTHER PUBLICATIONS

"TLC320AD50C/I, TLC320AD52C Sigma-Delta Analog Interface circuits with Master-Slave Function", Texas Instruments, document name: SLAS131E, Oct. 13, 2000.*

(Continued)

*Primary Examiner* — Leshui Zhang
(74) *Attorney, Agent, or Firm* — McAndrews, Held & Malloy, Ltd.

(57) ABSTRACT

A method and device for noise suppression in a data processing device may have input data entered into a storage device and saved as storage data, the storage data may be processed by a data processor and may be output as output data from the storage device. The input data may be scaled with an input scaling value from a scaling device, and the output data may be scaled with an output scaling value from the scaling device. When the input scaling value may be altered, the storage data may also be altered for noise suppression. The storage device and/or the scaling device may be configured and/or actuated such that the storage data may be changed in accordance with a change in the input scaling value. Some or all of the storage data may be changed in accordance with a change in the input scaling value, and upon a change in the input scaling value by a change value the storage data may also be changed with the same change value. Upon a change in the input scaling value, the output scaling value may be changed, and upon a change in the input scaling value by the change value, the output scaling value may be changed by the same change value. The output scaling value may be the inverse of the input scaling value, and the input scaling value may be changed if a value of the input data goes above or below a threshold value. The input scaling value may also be changed if a predetermined number of the input data values of the input data and/or the input data values for a predetermined duration go above or below a threshold value (e.g., in averaged or weighted manner). Upon going above the threshold value, the input scaling value may be set at a predetermined value. Upon going above or below the threshold value, the input scaling value may be changed by a scaling step value as the change value. A change in the storage data may occur at the same time as a change in the input scaling value, and a change in the output scaling value may occur at the same time as a change in the input scaling value.

18 Claims, 2 Drawing Sheets

(56) References Cited

U.S. PATENT DOCUMENTS 5,581,653 A * 12/1996 Todd .............................. 704/229
6,282,631 B1 * 8/2001 Arbel ............................. 712/35
6,898,235 B1 * 5/2005 Carlin et al. .................. 375/219

OTHER PUBLICATIONS

Kalliojärvi et al., "Roundoff Errors in Block-Floating-Point Systems," IEEE Transactions on Signal Processing, vol. 44, No. 4, Apr. 1996, pp. 783-790, XP 000592352.

Chhabra et al., "A Block Floating Point Implementation on the TMS320C54x DSP," Texas Instruments Application Report, Dec. 1999, pp. 1-10, XP007903070.

Berkeley Design Technology, Inc., "Choosing a DSP Processor," Internet Citation, 2000, XP007903051, pp. 1-8, URL: http://www.bdti.com/articles/choose_2000.pdf.

A. Arlo Reeves, "Optimized Fast Hartley Transform for the MC68000 with Applications in Image Processing," Thesis, Mar. 1990, pp. 1-129, XP007903064.

* cited by examiner

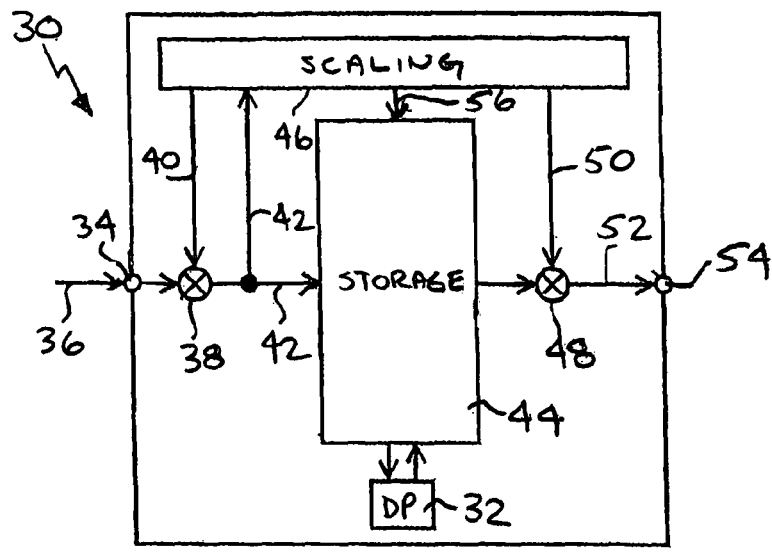
FIG. 1
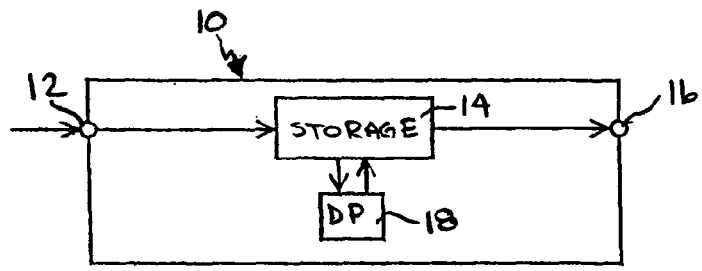
FIG. 6  PRIOR ART
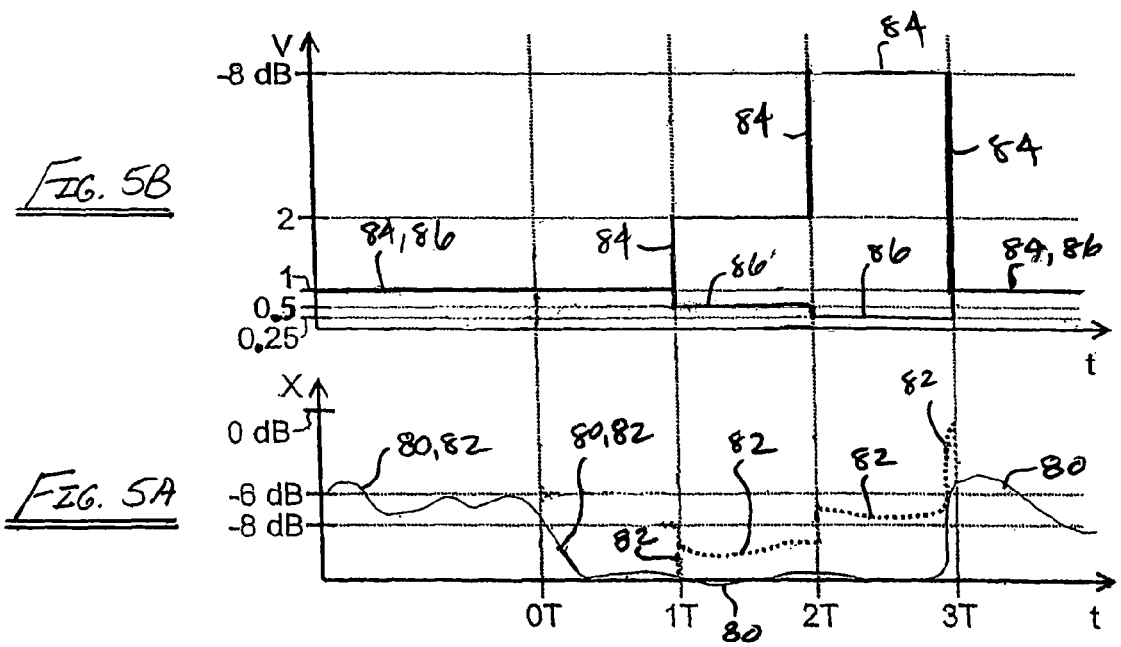
FIG. 5B
FIG. 5A

METHOD AND DEVICE FOR NOISE SUPPRESSION IN A DATA PROCESSING ARRANGEMENT

PRIORITY INFORMATION

This application claims priority from German patent application DE 10 2004 039 345.1, filed Aug. 12, 2004.

BACKGROUND OF THE INVENTION

The invention relates in general to audio signal processing and in particular to a method and device for noise suppression in audio signal data processing.

In the processing of signals (e.g., audio signals) in a data processing device, a problem often arises involving a quantization noise in an algorithm due to a limited word width, for example, a word width of 18 or 24-bits. FIG. 6 illustrates a prior art data processing device 10 having a data input 12 for receiving data, a storage device 14 with storage locations for saving the received data as storage data, a data output 16 for providing output data from the storage device 14, and a data processor 18 for processing the storage data. The device 10 may also include a scaling arrangement for scaling the received data with an entry scaling value. The data processor 18 may execute an algorithm that acts on the storage data. The data processing device 10 can be a simple delay element for transferring data values of a sequence of data with a time delay.

The limited word width of 18 or 24-bits commonly used with such a data processing device 10 often produces quantization noise in an algorithm acting on the storage data.

To reduce the noise, a data processing device may utilize a relatively larger word width. When using floating point numbers, each word includes a fixed-point portion and an exponent portion, which may require special hardware and a corresponding word width, since both the exponent portion and the fixed-point portion are operated on and saved.

The influence of quantization noise may be problematical when using noise-amplifying algorithms (e.g., digital filters) with low input levels. A scaling of the received input data or a corresponding back-scaling of output data from the storage device for better selection of the available word width can result in signal distortion. A time discrepancy may exist between the receipt of unscaled data values or those scaled with a different scaling value and put into the storage device, on the one hand, and the output of data values previously put into the storage device without scaling or storage data changed in scale for provision as output data. This time discrepancy between the input and output scaling values may be a problem.

What is needed is a method and a device for noise suppression in a data processing system that are relatively easy to implement and utilize a relatively limited word width.

SUMMARY OF THE INVENTION

A method of noise suppression in a data processing device that includes a storage device may include the steps where input data may be entered into a storage device and saved as storage data in respective storage locations, and the storage data may be output as output data from the storage device. The input data may be scaled with an input scaling value and the output data may be scaled with an output scaling value, and when the input scaling value may be altered the storage data in the storage locations may also be altered accordingly for noise suppression.

A corresponding data processing device with a data input for receiving input data may also include a storage device with storage locations for saving the input data as storage data, a data output for providing the output data from the storage device, a data processor for processing the storage data and a scaling device for scaling the input data with an input scaling value to the input data being saved. The storage device and/or the scaling device, which may be used for noise suppression, may be configured and/or actuated such that the storage data in the storage locations may be changed in accordance with a change in the input scaling value.

The method may have some or all of the storage data in the storage locations changed in accordance with a change in the input scaling value. Also, upon a change in the input scaling value by a change value, the storage data in the storage locations may also be changed with the same change value as the input scaling value. Further, upon a change in the input scaling value, the output scaling value may be changed accordingly, and upon a change in the input scaling value by the change value, the output scaling value may be changed with the same change value.

The output scaling value may be the inverse of the input scaling value. The input scaling value may be changed if a value of the input data goes above or below a threshold value. Also, the input scaling value may be changed if a predetermined number of the input data values of the input data and/or the input data values for a predetermined duration go above or below a threshold value, for example in averaged or weighted manner. Upon going above the threshold value, the input scaling value may be set at a predetermined value, for example, one. Further, upon going above or going below the threshold value, the input scaling value may be changed by a scaling step value as the change value.

A change in the storage data may, for example, be carried out at the same time as a change in the input scaling value. Further, a change in the output scaling value may, for example, be carried out at the same time as a change in the input scaling value.

The input data may include audio and/or video data. Accordingly, the data processor may be an audio and/or video data processor.

These and other objects, features and advantages of the present invention will become more apparent in light of the following detailed description of preferred embodiments thereof, as illustrated in the accompanying drawings.

BRIEF DESCRIPTION OF THE DRAWINGS

FIG. 1 is a block diagram illustration of a data processing device;

FIGS. 5A-5B are time plots of two signals in the operation of the method and device of FIGS. 1-4; and FIG. 6 is a block diagram illustration of a prior art data processing device.

DETAILED DESCRIPTION OF THE INVENTION

Figure 2:
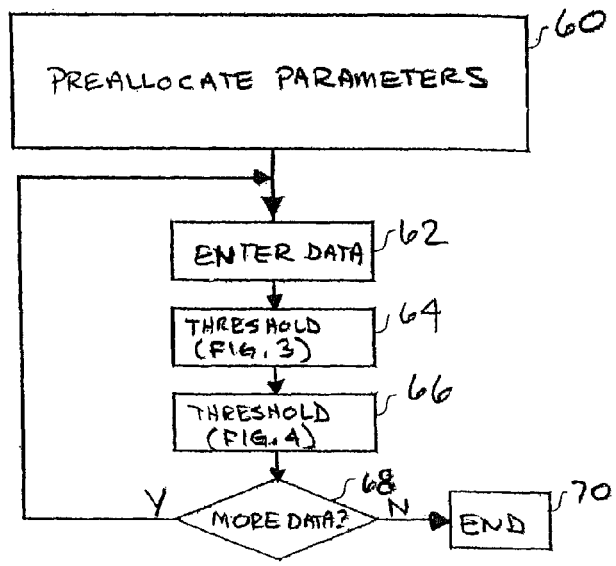
FIG. 2 is a flowchart illustration of a noise suppression technique that may be executed in the data processing device of FIG. 1.

FIG. 1 is a block diagram illustration of a data processing device 30. The term "device" may be construed broadly such that besides a complex device according to the type of circuit arrangement with a plurality of individual components or according to the type of an integrated layout with a plurality of integrated circuit components, the term "device" may also be understood to refer to individual components. In one simple case, for example, the device 30 may be a delay element into which data are entered and then output with a time delay. A conversion may also be possible as a method, computer algorithm or control algorithm. A data processor 32 as part of such a device 30 or a corresponding method can likewise involve an independent component, an independent control program or a complex algorithm, or a relatively simple configuration such as a delay element.

The data processing device 30 may include a data input 34 for receiving input data on a signal line 36. The input data on the line 36 can be individual data values from a sequence of data, for example, but also may be a plurality of grouped data values, which may form one or more words. The input data may be data values of an audio and/or video signal. The input data on the line 36 input to a first multiplier 38. The first multiplier 38 also receives an input scaling value on a line 40. The first multiplier 38 multiplies the input data value with a particular input scaling value. The product of the multiplication is output on a line 42 to a storage device 44. The output of the first multiplier 38 on the line 42 may also be input to a scaling device 46.

Depending on the configuration, the data signal lines 36, 40, 42 may be individual lines or bundles of lines, for example, a data bus. In the case of a data bus, the first multiplier 38 may be formed from a corresponding plurality of individual first multipliers.

The scaling device 46 may calculate the input scaling value provided on the line 40 in accordance with the presented value of the scaled input data on the line 42 or in accordance with a sequence of individual values of the scaled input data on the line 42. Alternative arrangements are possible in which the input data on the line 36 instead of the scaled input data on the line 42 are presented to the scaling device 46.

The scaled input data on the line 42 may be saved in the storage device 44, depending on the particular arrangement and functionality, in a plurality of storage locations. Depending on the configuration, the storage device 44 may be connected to the data processor 32. The data processor 32 can be configured as an integrated component of the storage device 44, as an independent subassembly, or as an interface for software access. In the case of a delay element, the data processor 32 may perform a time-delayed output of a value of the scaled input data on the line 42 entered into the storage device 44.

The storage device 44 provides an output to a second multiplier 48, which multiplies the output data from the storage device with an output scaling value on a signal line 50. The output scaling value on the line 50 may correspond to an inverse value of the input scaling value on the line 40. The output of the second multiplier 48 is provided on an output signal line 52.

The storage device 44 and/or the scaling device 46 may be configured and/or actuated such that the storage data in some or all of the storage locations may be changed in accordance with a change in the input scaling value on the line 40. As such, the storage device 44 may receive a scaling input on a line 56 from the scaling device 46.

The scaling device 46 may provide the single change value on the line 56, with which both the input scaling value on the line 40 and the storage data in the storage locations may be multiplied. The multiplication may occur at the same time, for example within a single system clock cycle. This way, the storage data stored at that moment in the storage device 44 may be altered with the same change value on the line 56 as the input scaling value on the line 40. Thus, there may be a uniform scaling for the storage data located in the storage device 44 and the scaled input data on the line 42 subsequently presented to the storage device 44.

At the same time as the change in the input scaling value on the line 40, a corresponding change in the output scaling value on the line 50 may also occur by dividing the output scaling value on the line 50 by the change value on the line 56 or by determining the inverse of the changed input scaling value on the line 40. This way, a back-scaling of the storage data may occur after being output from the storage device 44.

In an alternative embodiment, a partial scaling of the storage data in the storage device 44 at the same time as the change in the input scaling value on the line 40 may also be possible. For example, if the storage data presented at that moment at the output of the storage device 44 are to be scaled with the original output scaling value on the line 50, the output scaling value on the line 50 may be changed accordingly at a later time.

The scaling device 46 and the data processor 32 can be configured as a single component, or as a single algorithm.

Referring to the flowchart of FIG. 2, a noise suppression method may be implemented in the data processing device 30 of FIG. 1. The method may have the effect such that the input data on the line 36 may be scaled with the input scaling value on the line 40 so that the scaled input data on the line 42 have a desired selection within the storage device 44. After the storage device 44, the output data may be scaled back again using the output scaling value on the line 50, for example the output data may be decreased so that output data once again have the original signal level. To avoid disturbances from the scaling of the data without a distortion of the signal or the data sequence, a simultaneous scaling of the relevant data values may be provided. That is, at the same time as a changing of the input scaling value on the line 40 or the output scaling value on the line 50, all of the storage data in the storage device 44 may also be scaled accordingly. Since the storage data in the storage device 44 may have already been scaled, the storage data may be scaled with the change value on the line 56 which may be similar to the input scaling value on the line 40. This procedure may be used in conjunction with linear algorithms.

According to the flowchart of FIG. 2, various parameter values may be assigned in step 60. For a sequence of discrete gain factors, a range of 1 to 8 may be assigned, i.e., for example, the gain factor being used may be set in a range of 1 to 8, in particular for example corresponding to the values 1, 2, 4, 8. This may correspond, for example, to a gain in the range of from 0 to 18 dB. Also, an adjustment may be made to a signal level P, which is set for example at −6 dB. This corresponds to a reserve range (headroom) of 6 dB. A hysteresis value H may be set, for example, at −2 dB. As the change value on the line 56 or, in particular, the scaling step value on the line 56, it may be specified, for example, that the change value used from one cycle of the flowchart to another may be set at two. Besides considering individual values of the scaled input data on the line 42 each time, a procedure may be executed where a time sequence or a number of consecutive data values of the scaled input data on the line 42 are considered and weighted or averaged to institute a change in the scaling. For example, a predetermined duration or period of the cycle may be set at 80 ms. Furthermore, pre-settings of the scaling values may be used, or the input scaling value on the line 40 may be free of scaling at the start such that the input scaling value on the line 40 equals one. The output scaling value on the line 50 may be set accordingly, for example as the inverse of the input scaling value on the line 40.

In a second step 62 of the process, one or more scaled input data on the line 42 are entered in the storage device 44. A check may be made in separate steps 64, 66 (described in more detail hereinafter in FIGS. 3-4) whether the current value of the scaled input data on the line 42 or a sequence of values of the scaled input data on the line 42 are in a particular relation to a threshold value, for example above and/or below the threshold value. It may also be possible to use various threshold values to detect overshoot or undershoot. In particular, single value considerations are also possible for the case of an overdriving, in contrast with consideration of a plurality of values for underdriving or other deviations in the level of the scaled input data on the line 42. A subsequent test 68 checks whether any additional scaled input data on the line 42 are present. If there are additional scaled input data, the process reverts back to the step 62 for scaled input of the additional entry data on the line 42 into the storage device 44. Otherwise, the process may be ended in a step 70.

Figure 3:
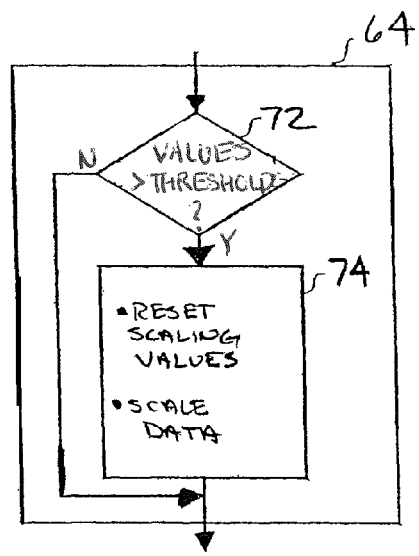
FIG. 3 is a flowchart illustration of a first subroutine of the noise suppression technique illustration in FIG. 2.

FIG. 3 is a flowchart for the step 64 of the flowchart of FIG. 2. In a first step 72, there may be a check, for example, as to whether the value of the scaled input data on the line 42 most recently entered is greater than a threshold value, using as the threshold value the value of the signal level P of −6 dB. This step 72 may also check whether the scaled input scaling value on the line 40 is greater than one, i.e., whether an amplifying scaling of the scaled input data on the line 36 is to be performed.

If both of these checks in the step 72 are negative, the step 64 may be ended. If both of these checks are positive, the input scaling value on the line 40 may be reset in a step 74 at a lower value, for example, at one. The value of one may avoid overdriving, at the expense of subsequent underdriving in the event that the overdriving was only slight. As an alternative, various types of reduction in the size of the input scaling value on the line 40 can be used, depending on different threshold values, to achieve a gradual reduction of the input scaling value on the line 40. Furthermore, in this step 74 the storage data at the storage locations in the storage device 44 may each be multiplied with the particular output scaling value on the line 50, so that the scaling performed may be reversed. Also, in this step 74 the output scaling value on the line 50 may be reset, for example, as the inverse of the input scaling value on the line 40.

Alternatively, the input scaling value on the line 40 and the storage data at the storage locations in the storage device 44 may each be multiplied with the change value on the line 56, and the output scaling value on the line 50 may again be changed to the inverse of the input scaling value on the line 40.

Figure 4:
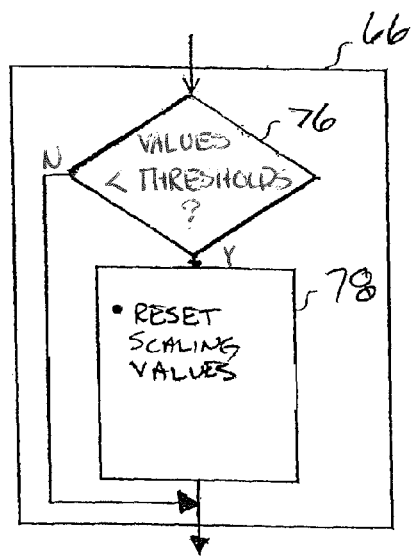
FIG. 4 is a flowchart illustration of a second subroutine of the noise suppression technique illustrated in FIG. 2.

FIG. 4 is a flowchart of the sample step 66 of the flowchart of FIG. 2. In a first step 76, the scaled input data on the line 42 may be compared with a threshold value for a period of time, for example, the signal level P of −6 dB minus the hysteresis value H of −2 dB. If all values during this period of time are less than the result of the comparison, and if the input scaling value on the line 40 is smaller than the maximum gain value of 8, then a change may be made to the scaling values in a step 78. At the same time, the input scaling value on the line 40 and the storage data in the storage locations may be multiplied with the change value on the line 56. Also, the output scaling value on the line 50 may be made the inverse of the updated entry scaling value on the line 40. After this step 78, or in the event of a negative result in the step 76, this step 66 may be ended.

FIG. 5A illustrates a time plot of an amplitude of the input data on the line 36 as represented by the curve 80, and of the scaled input data on the line 42 as represented by the curve 82 is a time plot of the input scaling value on the line 40 as represented by the curve 84, and of the output scaling value on the line 50 as represented by the curve 86. Consecutive time cycles are illustrated, each one of duration T, which may be used for example according to the step 66 in the flowcharts of FIGS. 2 and 4 for controlling the scaling values.

In a first time interval ending at 0T, the amplitude of the curve 80 of the input data on the line 36 fluctuates above the value of the signal level P of −6 dB, so that the curve 84 of the input scaling value on the line 40 may be set equal to one, that is, no amplification is performed. Accordingly, the input data on the line 42 stored in the storage device 44 may equal the input input data on the line 36. At a later time interval beginning at time 0T, there may be a reduction in the amplitude of the input data on the line 36 and thus a corresponding reduction of the input data on the line 42 below the value of the level P-H of −8 dB, set as the threshold value.

After the amplitudes remain for a cycle duration T (until time 1T) lower than the threshold value of −8 dB, a change then be may made to the change value on the line 56 for the scaling. The prior input scaling value on the line 40 of one may now be doubled as illustrated by the curve 84, since the change value used may be a scaling step value with a magnitude of two. Also, a corresponding multiplication of the current storage data with the change value on the line 56 and a resetting of the output scaling value on the line 50 to the inverse of the input scaling value on the line 40 (i.e., to 0.5 as illustrated by the curve 86) may occur. The amplitude of the scaled input data on the line 42 thereby increases to a higher value as illustrated by the curve 82, although still lying beneath the threshold value of −8 dB. The threshold value may be determined for example from the sum of the value of the signal level P of −6 dB and the hysteresis value H of −2 dB.

After another time period of T ending at time 2T, a change may occur in the scaling where the input scaling value on the line 40 may be doubled to an amplification of four as illustrated by the curve 84. The storage data in the storage device 44 at that time may be multiplied with the change value on the line 56. The output scaling value on the line 50 may again be set to the inverse of the input scaling value on the line 40 and correspondingly becomes equal to 0.25 as illustrated by the curve 86. This increases the amplitude of the scaled input data on the line 42 as illustrated by the curve 82, even though the input data on the line 36 may still be at a relatively low level.

For the duration of a following cycle T until time 3T, the scaled input data on the line 42 lie above the threshold value of −8 dB due to the scaling as illustrated by the curve 82. A reduction or cancellation of the scaling may then take place in the period of time T following time 3T, either by an immediate resetting of both of the scaling values to one, as illustrated by the curves 84, 86, or by a gradual reducing of both of the scaling values.

The method of noise suppression and the corresponding device may offer benefits. For example, due to the simultaneous scaling of the scaling factors and the immediate memory contents, there may be no disturbance of the signal or the data sequence. The signal-to-noise ratio of the device may be advantageously increased by amplification, as described herein, by 18 dB. Advantageously, only one variable may be needed for an exponent. Such a method and device may be useful for audio algorithms. Fixed-point processors can also advantageously be used for implementation. The computational expense can be specified by the changing of the scaling values after a particular duration or period of time, so that the computational expense may occur once per cycle.

Although the present invention has been illustrated and described with respect to several preferred embodiments thereof, various changes, omissions and additions to the form and detail thereof, may be made therein, without departing from the spirit and scope of the invention.

What is claimed is:

1. A method for noise suppression in an integrated circuit data processing device having a storage device with at least one storage location, comprising:
   receiving input data in the integrated circuit, wherein the received input data comprises audio and/or video data; and
   suppressing noise in the received input data, the suppressing of noise comprising:
      scaling the received input data with an input scaling value in the integrated circuit to provide scaled input data indicative thereof;
      entering the scaled input data into the storage device in the integrated circuit, saving the scaled input data as storage data in the at least one storage location, and providing the storage data as output data from the storage device;
      scaling the output data in the integrated circuit with an output scaling value;
      calculating the input scaling value based on the scaled input data; and
      when a change occurs in the input scaling value:
         applying the change in the input scaling value to the scaling of the received input data, and
         changing at the same time, and based on the change in the input scaling value, the storage data in the at least one storage location in the integrated circuit.

2. The method of claim 1, comprising changing the storage data in all storage locations when the change occurs in the input scaling value.

3. The method of claim 1, comprising changing the storage data in the at least one storage location based on the change in the input scaling value by applying a first change value when the input scaling value is changed by a second change value that is proportional to the first change value.

4. The method of claim 1, comprising changing the output scaling value, based on the change in the input scaling value, when the change occurs in the input scaling value.

5. The method of claim 4, comprising changing the output scaling value based on the change in the input scaling value by applying a first change value when the input scaling value is changed by a second change value that is proportional to the first change value.

6. The method of claim 1, comprising changing the input scaling value when the input data are in a certain relationship to a threshold value.

7. The method of claim 6, where the certain relationship comprises the entry data being greater than the threshold value.

8. The method of claim 7, where the changing of the input scaling value comprises setting the input scaling value at a predetermined value when the input data is greater than the threshold value.

9. The method of claim 6, where the certain relationship comprises the input data being less than the threshold value.

10. The method of claim 6, where the input scaling value is changed by a scaling step value when the input data are above or below the threshold value.

11. The method of claim 1, comprising changing the input scaling value when a predetermined number of data values of the input data are in a certain relationship to a threshold value for a predetermined period of time.

12. The method of claim 1, where the input data comprises video data.

13. The method of claim 1, where the input data comprises audio data.

14. A system comprising:
   an integrated circuit data processing device that is operable to suppress noise in input data that comprises audio and/or video data, the data processing device comprising:
      a scaling device that provides an input scaling value and an output scaling value;
      a first multiplier that multiplies input data by the input scaling value to provide scaled input data;
      a storage device having at least one storage location that saves the scaled input data as storage data and having an output for providing the storage data as output data; and
      a second multiplier that multiplies the output data by the output scaling value to provide scaled output data indicative thereof,
   where:
      one or both of the input scaling value and an output scaling value are set and/or adjusted to suppress noise in the input data;
      the scaling device calculates the input scaling value based on the scaled input data; and
      when a change occurs in the input scaling value, the storage data in the at least one storage location is changed, based on the change in the input scaling value at the same time that the change in the input scaling value is applied to the first multiplier.

15. The data processing device of claim 14, comprising a data processor for processing the storage data.

16. The data processing device of claim 14, where the scaling device provides a change value, and where the storage data in the at least one storage location are changed by the change value when the change occurs in the input scaling value by the change value.

17. The data processing device of claim 14, where the output scaling value is changed when the change occurs in the input scaling value.

18. A method for noise suppression using an integrated circuit having a storage device with at least one storage location, comprising:
   suppressing noise in input data that comprises audio and/or video data, the suppressing of noise comprising:
      storing scaled first input data in the at least one storage location as second storage data, and providing first storage data as first output data from the storage device;
      scaling second input data with an input scaling value to provide scaled second input data indicative thereof;
      scaling the first output data with an output scaling value;
      calculating the input scaling value based on the scaled second input data;
      when a change occurs in the input scaling value, applying the change in the input scaling value to scaling of third input data, and changing at the same time the second storage data in the at least one storage location based on the change in the input scaling value; and
      storing the scaled second input data in the storage device as third storage data.

* * * * *